Oct. 27, 1953 E. H. COX ET AL 2,656,724
AUTOMATIC APPARATUS FOR THE TAKING OF LIQUID SAMPLES
Filed Dec. 29, 1950
Fig. 1.
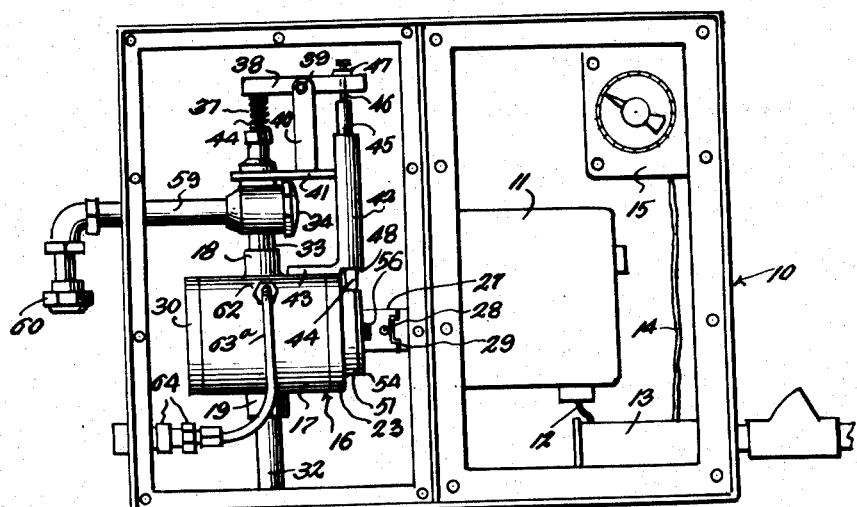
Fig. 4.
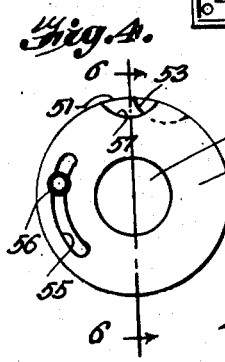
Fig. 5.
Fig. 2.
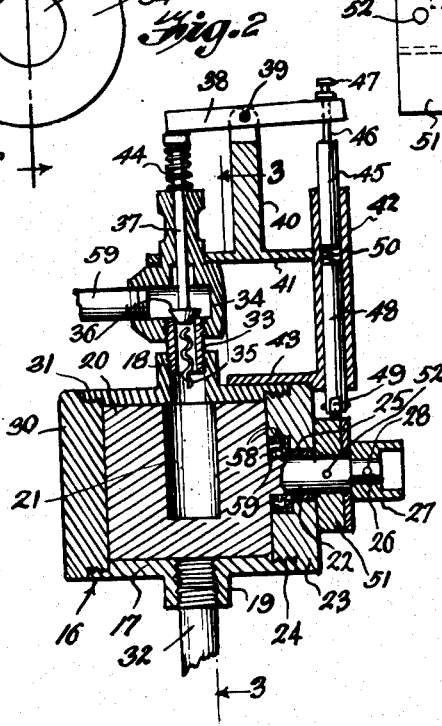
Fig. 3.
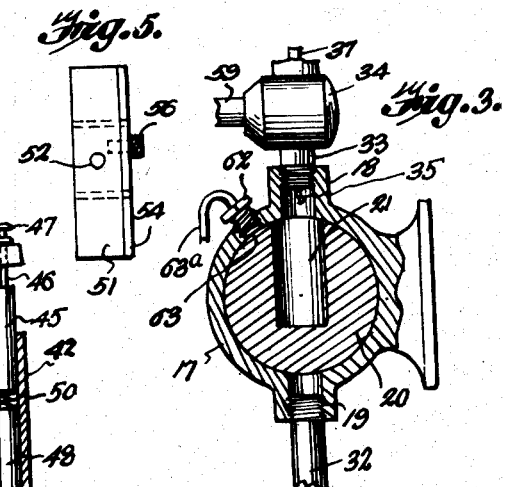
Fig. 6.
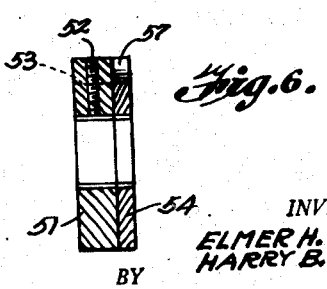
INVENTORS
ELMER H. COX AND
HARRY B. COPELAND
BY
Patrick D. Beavers
ATTORNEY Patented Oct. 27, 1953

2,656,724

UNITED STATES PATENT OFFICE 2,656,724

AUTOMATIC APPARATUS FOR THE TAKING OF LIQUID SAMPLES

Elmer H. Cox and Harry B. Copeland, Martinsville, Ill.

Application December 29, 1950, Serial No. 203,512

1 Claim. (Cl. 73—422)

The present invention relates to an automatic apparatus for the taking of liquid samples and it consists in the combinations, constructions and arrangements of parts herein described and claimed.

Generally there is provided an apparatus for taking of samples of liquids at timed intervals and in a definite quantity in each of such samples. A housing is provided wherein is mounted a revoluble measuring device which is mechanically connected to an electric motor which, in turn, is electrically connected to a timer. The measuring device is connected by a pipe to a source of liquid to be measured and by a discharge pipe from which the measured samples may be received. Novel mechanical means, including a shock absorber, is provided for controlling a valve interposed in the line leading from the source of supply to the measuring device. There is also provided a novel agitator.

It is accordingly an object of the invention to provide a novel automatic apparatus for the taking of liquid samples which is particularly adaptable to the taking of such samples from pipelines or the like.

A further object of the invention is the provision, in a device of the character set forth, of a novel motor-operated measuring device.

A further object of the invention is the provision, in a device of the character set forth, of novel means for the disposition of overflow from the measuring device.

A further object of the invention is the provision, in a device of the character set forth, of a novel valve-operating mechanism forming a part of the invention.

Other and further objects of the invention will become apparent from a reading of the following specification taken in conjunction with the drawing, in which:

Figure 1 is an elevational view of an embodiment of the invention,

Figure 2 is an enlarged vertical fragmentary sectional view, partly in elevation, and illustrating a measuring device and valve-operating mechanism both forming a part of the invention, Figure 3 is a sectional view taken substantially along line 3—3 of Figure 2, and being shown partly in elevation, Figure 4 is an end elevational view of a roller utilized in the invention, Figure 5 is a side elevational view of Figure 4, and Figure 6 is a sectional view taken along line 6—6 of Figure 4.

Referring more particularly to the drawing, there is shown therein a container generally indicated at 10 and having mounted therein an electric motor 11 connected by suitably insulated wires 12 with a panel 13 which is, in turn, connected by suitably insulated wiring 14 with a timer 15, the latter being preferably of the electrically operated type.

A meter, generally indicated at 16, is likewise mounted within the housing 10 and consists essentially of a cylindrical casing 17 which extends horizontally with reference to the ground and which is provided with an upper fitting 18 and a lower fitting 19. Revolubly mounted within the casing 17 is a solid cylindrical rotor 20 which is provided centrally with an axially extending opening 21 in this case extending beyond the longitudinal axis of the rotor 20.

Integrally formed at the inner end of the rotor 20 is a shaft 22 which extends through an inner end cap 23 which is threaded to the casing 17, as indicated at 24. Suitable packing 25 is interposed between the shaft 22 and the end cap 23. The shaft 22 is provided with a reduced portion 26 which has affixed thereto a coupling member 27 by means of a metal screw 28 or the like. The coupling 27 is coupled to a coupling 29 carried by the shaft of the motor 11. An outer end cap is threadably connected to the casing 17, as indicated at 31, the outer end cap being indicated at 30. Connected to the fitting 19 and extending downwardly through the lower end of the housing 10 is a discharge pipe 32 while connected with the fitting 18 is an upwardly extending relatively short pipe 33 whose upper end is threadably connected with a valve housing 34. A spiral agitator 35 is mounted in the pipe 33 and seated in the upper end of the pipe 33 is a valve 36 having an upwardly and vertically extending valve stem 37 which extends through the upper end of the valve housing 34 and whose upper end is connected with a rocker arm 38, which is pivoted, as indicated at 39, to the upper end of a standard 40 whose lower end is affixed to a horizontal bracket member 41 one end of which encompasses the valve housing 34 and the other end of which is affixed to a vertical cylindrical guideway 42.

A lower horizontal bracket member 43 is likewise affixed to the guideway 42 and is attached to the upper end of the casing 17 by welding or like means.

A compression spring 44 surrounds the valve stem 37 and bears against the upper end of the valve housing 34 and the lower end of one side of the rocker arm 38.

An upper plunger 45 is vertically and slidably mounted in the upper end of the guideway 42 and is provided with a reduced portion 46 which extends upwardly and through the other end of the rocker arm 38 and terminates in a collar 47. A lower cylindrical plunger 48 is vertically and slidably mounted in the lower end of the guideway 42 and has a roller 49 mounted in the lower end thereof. A compression spring 50 is mounted within the guideway 42 and bears against the lower end of the plunger 45 and the upper end of the plunger 48.

A cam roller 51 is affixed to the shaft 22 between the end plate 23 and the coupling 27 by means of a metal screw 52 or the like and is generally cylindrical in shape. The outer periphery is, however, provided with an arcuate indentation 53. A circular adjusting plate 54 whose outer measurements are identical with the roller 51 is mounted upon the shaft 22 between the roller 51 and the coupling 27. The plate 54 is provided with an arcuate slot 55 through which a headed bolt 56 extends and which bolt is threadably engaged in the side of the roller 51. The plate 54 is provided with an arcuate indentation in its outer periphery, as indicated at 57.

The inner face of the end cap 23 is provided with a circular recess 58 in which may be mounted a "Garlock closure." The valve housing 34 is connected with an inlet pipe 59 which extends laterally through the housing 10 and which is provided with a fitting 60 with which the same may be connected with a pipe or the like through which a continuous flow of liquid to be tested passes.

The pipe 32 is provided with a fitting 61 with which may be connected a pipe or conduit which may lead the fluid discharged from the metering device 16 to a point where the same may be tested.

A fitting 62 is threadably connected in an opening 63 adjacent the upper end of the casing 17 and has connected thereto a generally downwardly extending conduit 63a which is, in turn, connected with suitable fittings 64 which extend through one side of the container 10 and which, in their turn, are connected with the source of fluid supply.

In operation, it will be apparent that when a predetermined period of time has elapsed, the timer 15 will act to supply electrical current to the motor 11 which will revolve the rotor 20 through the motor shaft, the coupling members 27 and 29 and the rotor shaft 22. It will be understood that the recess 21 will be normally facing in a downward position and it will be further understood that the motor 11 will act to perform but one revolution when activated by the timer 15 and a suitable source of electrical current.

As the rotor turns within the casing 17, the recess 21 will eventually register with the fitting 18. As this occurs the roller 49 will drop into the combined indentations 53 and 57 for such time as they register with such roller 49. This action will allow a downward movement of the plunger 48 and consequently a downward movement of the plunger 45 which, in turn, will cause the rocker arm to move clockwise, as viewed for example in Figures 1 and 2. This last mentioned action will act to lift the valve stem 37 through the action of the compression spring 44 to thus lift the valve 36 and its seat in the upper end of the pipe 33. This action will allow oil or other fluid from the source of supply to be tested to pass momentarily through the pipe 33 and into the recess 21 which will, thereafter, through the further revolution of the rotor 20 deliver the sample thus ensconced in such recess 21 to the outlet pipe 32. As the roller 49 leaves the combined indentations 53 and 57, it will again impinge upon the combined outer faces of the members 51 and 54 thus reversing the action heretofore referred to to thus close the valve 36. It will be understood that the sample of fluid thus received and delivered by the recess 21 may then be led to any suitable place by a conduit connection with the fitting 61 after which it may be tested for water content, impurities and the like.

It will also be seen that the combined indentations 53 and 57 may be made larger or smaller by adjusting the relative position of the plate 54 with respect to the roller 51 through the loosening and tightening of the screw 56 which passes through the notch 55 and it will also be apparent that the agitator 35 will impart a spiral motion to the fluid entering the recess 21 from the pipe 59 to thereby assure the fluid properly filling the recess 21. Again, it will be apparent that any excess of fluid received in the recess 21 will be forced outwardly through the opening 63 and thence into the overflow conduit 63a whence it will be delivered back to the source of supply. This will occur as the rotor 20 completes its revolution after being in registry with the fitting 18.

While but one form of the invention has been shown and described herein, it will be readily apparent to those skilled in the art that many minor modifications may be made without departing from the spirit of the invention or the scope of the appended claim.

What is claimed is:

An apparatus of the character described comprising, in combination, a revoluble metering device having a casing provided with an inlet at its upper side and an outlet at its lower side, a rotor in said casing having a radially extending recess registerable consecutively with said inlet and said outlet, an electric motor connected with said rotor, a timing device supplying electrical current to said motor at predetermined intervals, a valve, a vertical pipe interconnecting said valve and said inlet, a conduit interconnecting said valve and a source of flowing liquid, and means actuated by said motor for opening said valve when said recess is in registry with said inlet and closing said valve when said recess is out of registry with said inlet.

ELMER H. COX.
HARRY B. COPELAND.

References Cited in the file of this patent
UNITED STATES PATENTS

| Number | Name | Date |
|---|---|---|
| 1,691,687 | Watts | Nov. 13, 1928 |
| 2,105,262 | Price | Jan. 11, 1938 |
| 2,183,338 | Slough | Dec. 12, 1939 |
| 2,348,806 | Gillard et al. | May 16, 1944 |